US012315243B2

United States Patent
Zhou et al.

(10) Patent No.: US 12,315,243 B2
(45) Date of Patent: May 27, 2025

(54) IMAGE DETECTION METHOD AND APPARATUS, AND ELECTRONIC DEVICE

(71) Applicant: HUAWEI TECHNOLOGIES CO., LTD., Guangdong (CN)

(72) Inventors: Deyu Zhou, Shenzhen (CN); Yuewan Lu, Shenzhen (CN); Chen Dong, Shenzhen (CN); Yongtao Jiang, Shenzhen (CN); Wenmei Gao, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 340 days.

(21) Appl. No.: 17/778,469

(22) PCT Filed: Nov. 13, 2020

(86) PCT No.: PCT/CN2020/128786
§ 371 (c)(1),
(2) Date: May 20, 2022

(87) PCT Pub. No.: WO2021/098609
PCT Pub. Date: May 27, 2021

(65) Prior Publication Data
US 2023/0005254 A1 Jan. 5, 2023
US 2023/0245441 A9 Aug. 3, 2023

(30) Foreign Application Priority Data
Nov. 22, 2019 (CN) .......................... 201911159693.8

(51) Int. Cl.
*G06V 10/98* (2022.01)
*G06V 10/25* (2022.01)
*G06V 10/60* (2022.01)

(52) U.S. Cl.
CPC .............. *G06V 10/98* (2022.01); *G06V 10/25* (2022.01); *G06V 10/60* (2022.01)

(58) Field of Classification Search
None
See application file for complete search history.

(56) References Cited

U.S. PATENT DOCUMENTS 9,516,237 B1 * 12/2016 Goyal ................. H04N 25/533
2003/0095797 A1   5/2003 Nakata
(Continued)

FOREIGN PATENT DOCUMENTS

| CN | 100534143 C | 8/2009 |
| CN | 102006422 A | 4/2011 |

(Continued)

OTHER PUBLICATIONS

Office Action for Chinese Application No. 201911159693.8 dated Jul. 29, 2023, 7 pages.
(Continued)

*Primary Examiner* — Edward Park

(57) ABSTRACT

The technology of this application relates to an artificial intelligence terminal-based image detection method and apparatus, and an electronic device. The method includes obtaining a to-be-detected image, determining a light source region of the to-be-detected image and a foreground region of the to-be-detected image, and determining a blurring degree of the to-be-detected image based on the light source region and the foreground region. Impact of a light source on clarity of the to-be-detected image is determined by performing light source region detection and foreground region detection on the to-be-detected image, to effectively detect whether an image shot in a backlight condition is blurred.

15 Claims, 9 Drawing Sheets

(56) References Cited

U.S. PATENT DOCUMENTS

2016/0373655 A1* 12/2016 Kobayashi ............. H04N 23/62
2023/0005254 A1*  1/2023 Zhou ...................... G06V 10/60

FOREIGN PATENT DOCUMENTS

| | | |
|---|---|---|
| CN | 103177422 A | 6/2013 |
| CN | 103646392 A | 3/2014 |
| CN | 103905737 A | 7/2014 |
| CN | 102542552 B | 6/2015 |
| CN | 105430292 A | 3/2016 |
| CN | 105657287 A | 6/2016 |
| CN | 106973236 A | 7/2017 |
| CN | 107277356 A | 10/2017 |
| CN | 107451969 A | 12/2017 |
| CN | 107958231 A | 4/2018 |
| CN | 105450932 B | 11/2018 |
| CN | 108734676 A | 11/2018 |
| CN | 108764040 A | 11/2018 |
| CN | 110111281 A | 8/2019 |
| JP | 2011076198 A | 4/2011 |

OTHER PUBLICATIONS

Goncharova Alena V. et al: "The regression model for theprocedure of correction of photos damaged by backlighting",Proceedings of the 5th International Conference Oninformation Technology and Nanotechnology ITNT 2019, May 21, 2019, pp. 326 333, XP55978843, DOI:10.18287/1613 0073 2019 2391-326-333, ISBN:978-5-6047396-0 0; URL:https://ceur-ws.org/Vol 2391 /paper45.pdf.

Bonghyup Kang et al: "Adaptive height-modified histogramequalization and chroma correction in YCbCr color space for fast backlightimage compensation",Image and Vision Computing, Elsevier,Guildford, GB, vol. 29, No. 8, Jun. 3, 2011 pp. 557 568,XP28260283, ISSN:0262-8856, DOI:10.1016/J.IMAVIS.2011.06.001.

Extended European Search Report for EP Application No. 20890350 dated Nov. 25, 2022, 9 pages.

PCT International Search Report for Application No. PCT/CN2020/128786 dated Nov. 13, 2020, 10 pages.

Chinese Office Action for Application No. 2024042700251610 dated Apr. 27, 2024, 6 pages.

Office Action for Chinese Application No. 201911159693.8 dated Apr. 27, 2024, 6 pages.

* cited by examiner

IMAGE DETECTION METHOD AND APPARATUS, AND ELECTRONIC DEVICE

CROSS-REFERENCE TO RELATED APPLICATION(S)

This application is a National Stage of International Application No. PCT/CN2020/128786, filed on Nov. 13, 2020, which claims priority to Chinese Patent Application No. 201911159693.8, filed on Nov. 22, 2019, both of which are hereby incorporated by reference in their entireties.

TECHNICAL FIELD

This application pertains to the field of electronic technologies, and in particular, to an artificial intelligence (AI) terminal-based image detection method and apparatus, and an electronic device.

BACKGROUND

During photographing, an existing mobile terminal (for example, a mobile phone, a tablet, or a camera) can only detect whether a backlight source exists in a photographing process, but cannot detect whether backlight blur exists in a shot image.

SUMMARY

Embodiments of this application provide an artificial intelligence terminal-based image detection method and apparatus, and an electronic device, to effectively detect whether an image shot in a backlight condition is blurred.

According to a first aspect, an embodiment of this application provides an image detection method, including: obtaining a to-be-detected image; determining a light source region of the to-be-detected image and a foreground region of the to-be-detected image; and determining a blurring degree of the to-be-detected image based on the light source region and the foreground region.

In the first aspect, impact of a light source on clarity of the to-be-detected image is determined by performing light source region detection and foreground region detection on the to-be-detected image, to effectively detect whether an image shot in a backlight condition is blurred.

In a possible implementation of the first aspect, the determining a light source region of the to-be-detected image includes: performing color space conversion on the to-be-detected image, and obtaining a brightness value of each pixel of the image obtained through the color space conversion; and determining a region of a pixel whose brightness value is greater than a preset brightness threshold as the light source region of the to-be-detected image.

For example, the to-be-detected image is converted to an HSV (Hue, Saturation, Value) color space or an LAB (CIELAB color model) color space through the color space conversion.

It should be understood that the to-be-detected image may also be converted to another color space to determine the brightness value of each pixel of the to-be-detected image.

The color space conversion is performed on the to-be-detected image to determine brightness of each pixel, and the light source region of the to-be-detected image can be determined according to a threshold segmentation method, so that the light source region can be accurately and quickly determined, to improve image detection efficiency.

In a possible implementation of the first aspect, the determining a foreground region of the to-be-detected image includes: detecting a foreground target of the to-be-detected image; and determining a location of the foreground target in the to-be-detected image, and determining the location of the foreground target in the to-be-detected image as the foreground region of the to-be-detected image.

It should be understood that the foreground target may be a target having a dynamic feature in the to-be-detected image, for example, a person or an animal, or the foreground target may be a scene that is close to a viewer and that has a static feature, for example, a flower or food.

In a possible implementation of the first aspect, the determining a blurring degree of the to-be-detected image based on the light source region and the foreground region includes: determining the blurring degree of the to-be-detected image based on a quantity of all pixels in the light source region and a quantity of all pixels in the foreground region.

With reference to the previous possible implementation, the determining the blurring degree of the to-be-detected image based on a quantity of all pixels in the light source region and a quantity of all pixels in the foreground region includes: determining whether a function value of an increasing function of a ratio of the quantity of all pixels in the light source region to the quantity of all pixels in the foreground region is greater than a predetermined threshold; and if the function value of the increasing function of the ratio of the quantity of all pixels in the light source region to the quantity of all pixels in the foreground region is greater than the predetermined threshold, determining that the to-be-detected image is a blurred image.

In a possible implementation of the first aspect, the determining a blurring degree of the to-be-detected image based on the light source region and the foreground region includes: determining the blurring degree of the to-be-detected image based on a quantity of all pixels in the light source region and an area of the foreground region.

In a possible implementation of the first aspect, the obtaining a to-be-detected image includes: obtaining a preview frame image in a first shooting mode; and correspondingly, the determining a blurring degree of the to-be-detected image based on the light source region and the foreground region includes: if it is determined, based on the light source region and the foreground region, that the preview frame image is a blurred image, switching a current shooting mode from the first shooting mode to a second shooting mode, where the first shooting mode is different from the second shooting mode.

For example, the first shooting mode is a Torch mode, and the second shooting mode is a Flash mode. The switching a current shooting mode from the first shooting mode to a second shooting mode includes an electronic device sending a control instruction to a flashlight module of the electronic device, to switch a flashlight from a steady-on mode to a mode in which the flashlight flashes once during photographing.

According to a second aspect, an embodiment of this application provides an image detection apparatus, including: an image obtaining module, configured to obtain a to-be-detected image; a first determining module, configured to determine a light source region of the to-be-detected image and a foreground region of the to-be-detected image; and a second determining module, configured to determine a blurring degree of the image based on the light source region and the foreground region.

According to a third aspect, an embodiment of this application provides a terminal device, including a memory, a processor, and a computer program that is stored in the memory and that can be run on the processor. When executing the computer program, the processor implements steps in the image detection method according to the first aspect.

According to a fourth aspect, an embodiment of this application provides a computer-readable storage medium. The computer-readable storage medium stores a computer program. When the computer program is executed by a processor, steps in the image detection method according to the first aspect are implemented.

According to a fifth aspect, an embodiment of this application provides a computer program product. When the computer program product runs on a terminal device, the terminal device is enabled to perform the image detection method according to any one of the first aspect or the possible implementations of the first aspect.

It may be understood that, for beneficial effects of the second aspect to the fifth aspect, refer to related descriptions in the first aspect.

Compared with the conventional technology, embodiments of this application have the following beneficial effects: Impact of a light source on clarity of the to-be-detected image is determined by performing light source region detection and foreground region detection on the to-be-detected image, to effectively detect whether an image shot in a backlight condition is blurred.

DESCRIPTION OF EMBODIMENTS

In the following descriptions, to illustrate rather than limit, specific details such as a particular system structure and a technology are provided to make a thorough understanding of embodiments of this application. However, persons skilled in the art should know that this application may also be implemented in other embodiments without these specific details. In other cases, detailed descriptions of well-known systems, apparatuses, circuits, and methods are omitted, so that this application is described without being obscured by unnecessary details.

It should be understood that, when used in the specification and claims of this application, the term "include" indicates presence of described features, entireties, steps, operations, elements, and/or components, but does not exclude presence or addition of one or more other features, entireties, steps, operations, elements, components, and/or collections thereof.

It should be further understood that the term "and/or" used in the specification and claims of this application indicates any combination and all possible combinations of one or more items listed in association, and includes the combinations.

As used in the specification and claims of this application, the term "if" may be interpreted as "when", "once", "in response to determining", or "in response to detecting" depending on the context. Similarly, the phrase "if it is determined" or "if the [described condition or event] is detected" may be interpreted as meaning "once determined" or "in response to determining" or "once the [described condition or event] is detected" or "in response to detecting the [described condition or event]" depending on the context.

In addition, in the descriptions of the specification and claims of this application, the terms "first", "second", "third", and the like are merely intended for a purpose of differentiated description, but shall not be understood as an indication or an implication of relative importance.

Referring to "an embodiment" or "some embodiments" or the like in the specification of this application means that one or more embodiments of this application include a specific feature, structure, or characteristic described with reference to the embodiment. Therefore, statements such as "in an embodiment", "in some embodiments", "in some other embodiments", and "in other embodiments" that appear at different places in this specification do not necessarily mean referring to a same embodiment. Instead, the statements mean "one or more but not all of the embodiments", unless otherwise specifically emphasized in another manner. The terms "include", "have", and their variants all mean "include but are not limited to", unless otherwise specifically emphasized in another manner.

Figure 1A:
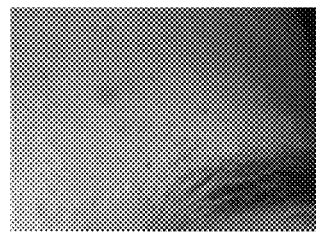
FIG. 1a is an example schematic diagram of an image shot by an existing electronic device in a Torch mode when there is no backlight source.
Figure 1B:
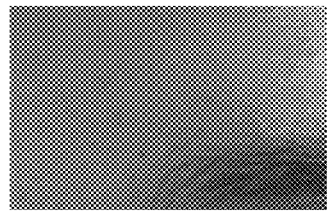
FIG. 1b is an example schematic diagram of an image shot by an existing electronic device in a Flash mode under the condition that a luminous intensity of a backlight source is 23 lux and a luminous intensity area of the backlight source is 50%.
Figure 1C:
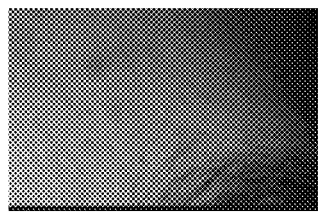
FIG. 1c is an example schematic diagram of an image shot by an existing electronic device in a Torch mode when there is no backlight source.
Figure 1D:
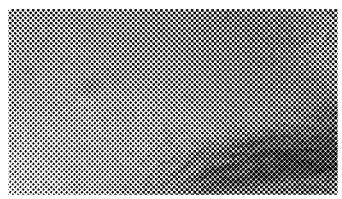
FIG. 1d is an example schematic diagram of an image shot by an existing electronic device in a Flash mode under the condition that a luminous intensity of a backlight source is 23 lux and a luminous intensity area of the backlight source is 50%.

It should be noted that backlight in this application refers to a case in which a photographed subject is just located between a light source and a camera. In this case, the photographed subject is very likely to be underexposed. As a result, a shot image cannot clearly reflect facial skin details, for example, detail features such as fine lines, nasolabial folds, dark eye circles, red regions, acne, pores, color spots, and blackheads. Images shot in different shooting modes present different clarity due to existence of a backlight source. The shooting modes include a first shooting mode (e.g., Torch mode) in which a flashlight is steady on and a second shooting mode (e.g., Flash mode) in which a flashlight flashes during photographing. FIG. 1a and FIG. 1c respectively show images shot by an existing electronic device in a Torch mode and a Flash mode when there is no backlight source. FIG. 1b and FIG. 1d respectively show images shot by an existing electronic device in a Torch mode and a Flash mode with backlight sources of a same luminous intensity (23 lux) and a same luminous intensity area (50%). It can be learned from FIG. 1a and FIG. 1c that, when there is no backlight source, a detail feature (e.g., acne) can be clearly photographed in both the Torch mode and the Flash mode. It can be learned from comparison between FIG. 1c and FIG. 1d that existence of the backlight source does not greatly affect the image shot in the Flash mode, and a detail feature (e.g., acne) can also be photographed. It can be learned from comparison between FIG. 1a and FIG. 1b that existence of the backlight source significantly affects clarity of the image shot in the Torch mode, and causes blurring of a detail feature (e.g., acne). Therefore, an image detection method in embodiments of this application is mainly used to detect an image shot in a Torch mode, and can be used to switch a current shooting mode from the Torch mode to a Flash mode when it is detected that a to-be-detected image is a blurred image. In actual application, photographing is performed based on different luminous intensities and different light source areas by using a dichotomy, to determine that a luminous intensity of 23 lux and a light source area of 25% are used as critical values for determining whether the image shot in the Torch mode is blurred. The light source area is a most important factor that affects whether a foreground is blurred. For a same foreground (a same face in different photos can be approximately considered as the same foreground), if a light source area is larger, impact on clarity of the foreground is greater. If the foreground is large enough and the light source area is small enough, the impact of the light source area on the clarity of the foreground can be ignored. Therefore, a relationship between a light source area and a foreground area is an important parameter for detecting whether feature details of a to-be-detected image are blurred. Whether backlight blur exists in the to-be-detected image can be determined based on light source region detection and foreground region detection. If it is detected that backlight blur exists in the to-be-detected image, the image is not used as an object for evaluating a facial skin status, to improve accuracy of evaluating the facial skin status. It should be noted that the foreground is a person or an object that is in front of a subject or near a front edge in a lens. The foreground in embodiments of this application may include a plurality of object types, for example, objects such as a person, a vehicle, a plant, an animal, a building, a ground, a sky, a table, a chair, and a door frame.

The image detection method provided in embodiments of this application may be applied to a terminal device such as an electronic device, a tablet computer, a wearable device, a vehicle-mounted device, an augmented reality (AR) device/a virtual reality (VR) device, a notebook computer, an ultra-mobile personal computer (UMPC), a netbook, or a personal digital assistant (PDA). A specific type of the terminal device is not limited in embodiments of this application.

By way of example but not limitation, when the terminal device is a wearable device, the wearable device may alternatively be a generic term for wearable devices such as glasses, gloves, watches, clothes, and shoes that are developed based on intelligent design of daily wearing by using wearable technologies. The wearable device is a portable device that is directly worn on a body or integrated into clothes or an accessory of a user. The wearable device is not only a hardware device, but also implements a powerful function through software support, data exchange, and cloud interaction. In a broad sense, the wearable intelligent device includes full-featured and large-sized devices that can implement all or some of functions without depending on smart electronic devices, for example, smart watches or smart glasses, and devices that focus on only one type of application function and need to be used with other devices such as smart electronic devices, for example, various smart bands or smart jewelry for monitoring physical signs.

Figure 2:
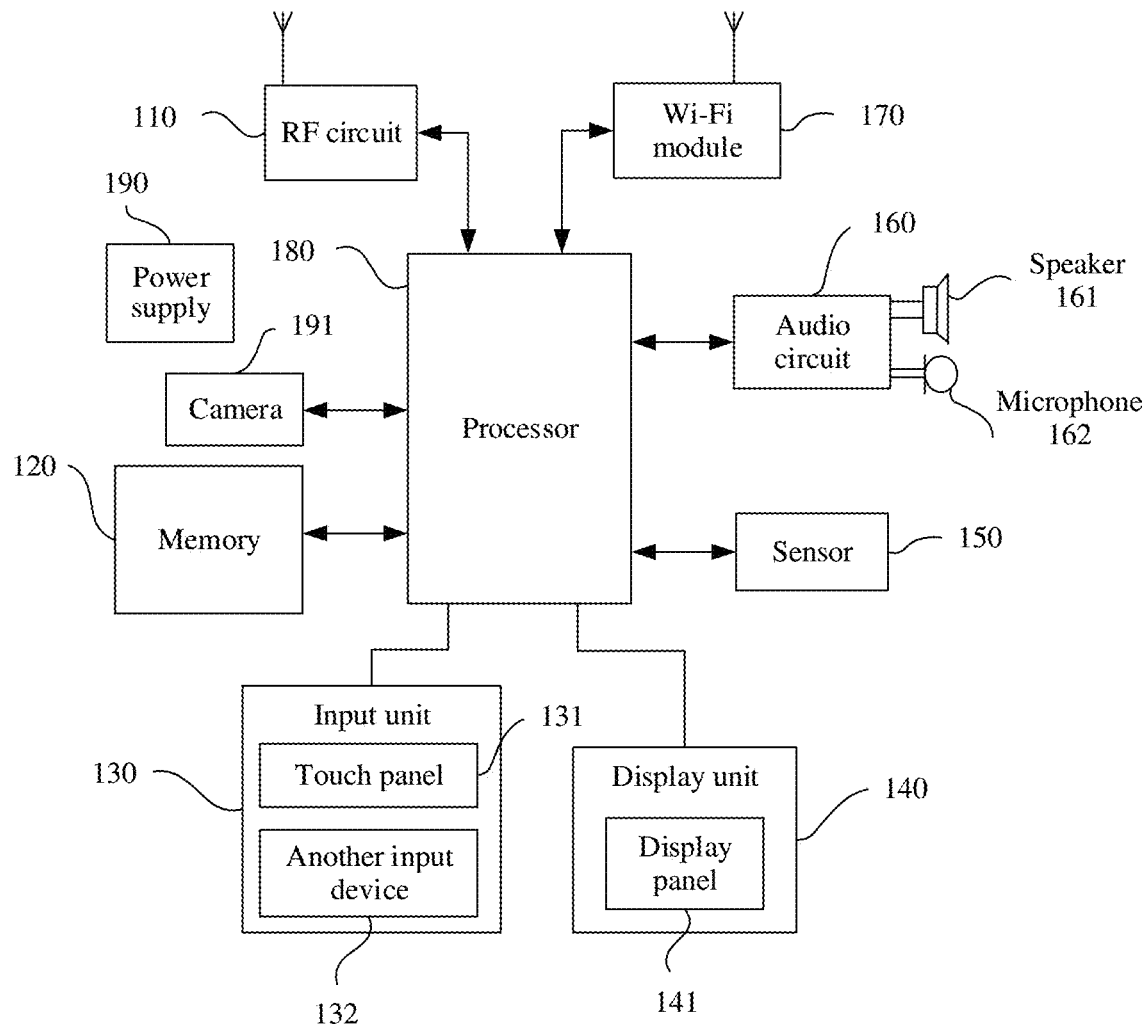
FIG. 2 is an example schematic diagram of a structure of an electronic device to which an image detection method is applicable according to an embodiment of this application.

FIG. 2 is a block diagram of a partial structure of an electronic device according to an embodiment of this application. Refer to FIG. 2. The electronic device includes components such as a radio frequency (RF) circuit 110, a memory 120, an input unit 130, a display unit 140, a sensor 150, an audio circuit 160, a wireless fidelity (Wi-Fi) module 170, a processor 180, a power supply 190, and a camera 191. Persons skilled in the art may understand that the structure of the electronic device shown in FIG. 1 constitutes no limitation on the electronic device, and the electronic device may include more or fewer components than those shown in the figure, or combine some components, or have different component arrangements.

The following describes the components of the electronic device in detail with reference to FIG. 2.

The RF circuit 110 may be configured to: receive and send a signal in an information receiving or sending process or a call process. Particularly, after receiving downlink information from a base station, the RF circuit 110 sends the downlink information to the processor 180 for processing, and sends related uplink data to the base station. Usually, the RF circuit includes but is not limited to an antenna, at least one amplifier, a transceiver, a coupler, a low noise amplifier (LNA), a duplexer, and the like. In addition, the RF circuit 110 may further communicate with a network and another device through wireless communication. The foregoing wireless communication may be any communications standard or protocol, which includes but is not limited to a global system for mobile communications (GSM), a general packet radio service (GPRS), code division multiple access (CDMA), wideband code division multiple access (WCDMA), long term evolution (LTE), an email, a short message service (SMS), and the like.

The memory 120 may be configured to store a software program and a module. The processor 180 performs various function applications of the electronic device and data processing by running the software program and the module that are stored in the memory 120. The memory 120 may mainly include a program storage region and a data storage region. The program storage region may store an operating system, an application required by at least one function (such as a sound playback function or an image playback function), and the like. The data storage region may store data (such as audio data or an address book) created based on use of the electronic device, and the like. In addition, the memory 120 may include a high-speed random access memory, or may include a nonvolatile memory, such as at least one magnetic disk storage device, a flash memory device, or another volatile solid-state storage device.

The input unit 130 may be configured to: receive entered digit or character information, and generate a key signal input related to a user setting and function control of the electronic device 100. Specifically, the input unit 130 may include a touch panel 131 and another input device 132. The touch panel 131, also referred to as a touchscreen, can collect a touch operation performed by the user on or near the touch panel 131 (for example, an operation performed by the user on or near the touch panel 131 by using any proper object or accessory such as a finger or a stylus), and drive a corresponding connection apparatus based on a preset program. Optionally, the touch panel 131 may include two parts: a touch detection apparatus and a touch controller. The touch detection apparatus detects a touch location of the user, detects a signal generated by the touch operation, and transfers the signal to the touch controller. The touch controller receives touch information from the touch detection apparatus, converts the touch information into touch point coordinates, then sends the touch point coordinates to the processor 180, and can receive and execute a command sent from the processor 180. In addition, the touch panel 131 may be implemented by using a plurality of types, such as a resistive type, a capacitive type, an infrared ray type, and a surface acoustic wave type. In addition to the touch panel 131, the input unit 130 may further include the another input device 132. Specifically, the another input device 132 may include but is not limited to one or more of a physical keyboard, a function key (such as a volume control key or an on/off key), a trackball, a mouse, and a joystick.

The display unit 140 may be configured to display information entered by the user or information provided for the user, and various menus of the electronic device. The display unit 140 may include a display panel 141. Optionally, the display panel 141 may be configured in a form of a liquid crystal display (LCD), an organic light-emitting diode (OLED), or the like. Further, the touch panel 131 may cover the display panel 141. When detecting the touch operation on or near the touch panel 131, the touch panel 131 transfers the touch operation to the processor 180 to determine a type of a touch event, and then the processor 180 provides a corresponding visual output on the display panel 141 based on the type of the touch event. Although the touch panel 131 and the display panel 141 are used as two independent parts in FIG. 1 to implement input and input functions of the electronic device, in some embodiments, the touch panel 131 and the display panel 141 may be integrated to implement the input and output functions of the electronic device.

The electronic device 100 may further include at least one sensor 150 such as a light sensor, a motion sensor, and another sensor. Specifically, the light sensor may include an ambient light sensor and a proximity sensor. The ambient light sensor may adjust luminance of the display panel 141 based on brightness of ambient light. The proximity sensor may turn off the display panel 141 and/or backlight when the electronic device moves to an ear. As a motion sensor, an accelerometer sensor may detect values of acceleration in all directions (usually, three axes), may detect a value and a direction of gravity when the accelerometer sensor is static, and may be used in an application for recognizing a posture (such as switching between landscape mode and portrait mode, a related game, or magnetometer posture calibration) of the electronic device, a function related to vibration recognition (such as a pedometer or a knock), or the like. Other sensors may include a gyro, a barometer, a hygrometer, a thermometer, or an infrared sensor that may be further disposed on the electronic device.

The audio circuit 160, a speaker 161, and a microphone 162 may provide an audio interface between the user and the electronic device. The audio circuit 160 may convert received audio data into an electrical signal and then transmit the electrical signal to the speaker 161, and the speaker 161 converts the electrical signal into a sound signal for output. In addition, the microphone 162 converts a collected sound signal into an electrical signal. The audio circuit 160 receives the electrical signal, converts the electrical signal into audio data, and then outputs the audio data to the processor 180 for processing, to send the audio data to, for example, another electronic device through the RF circuit 110, or outputs the audio data to the memory 120 for further processing.

Wi-Fi belongs to a short distance wireless transmission technology. The electronic device may help, by using the Wi-Fi module 170, the user receive and send emails, browse a web page, access streaming media, and the like. The Wi-Fi module 170 provides wireless broadband internet access for the user. Although FIG. 1 shows the Wi-Fi module 170, it may be understood that the Wi-Fi module 170 is not a mandatory part of the electronic device 100, and may be omitted based on a requirement without changing the essence of the present technology.

The processor 180 is a control center of the electronic device. The processor 180 is connected to all parts of the entire electronic device by using various interfaces and lines, and performs various functions of the electronic device and data processing by running or executing the software program and/or the module stored in the memory 120 and invoking data stored in the memory 120, to perform overall monitoring on the electronic device. Optionally, the processor 180 may include one or more processing units. Preferably, the processor 180 may integrate an application processor and a modem processor. The application processor mainly processes an operating system, a user interface, an application, and the like. The modem processor mainly processes wireless communication. It may be understood that the modem processor may not be integrated into the processor 180.

The electronic device 100 further includes the power supply 190 (for example, a battery) supplying power to all parts. Preferably, the power supply may be logically connected to the processor 180 by using a power management system, to implement functions such as charging management, discharging management, and power consumption management by using the power management system.

The electronic device 100 may further include a camera 191. The camera 191 is configured to capture a static image or a video. An optical image of an object is generated through the lens, and is projected onto a photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to an ISP for converting the electrical signal into a digital image signal. The ISP outputs the digital image signal to a DSP for processing. The DSP converts the digital image signal into a standard image signal in an RGB format, a YUV format, or the like. Optionally, the camera may be disposed in front or rear of the electronic device 100. This is not limited in this embodiment of this application.

Optionally, the electronic device 100 may include one camera, two cameras, three cameras, and the like. This is not limited in this embodiment of this application.

For example, the electronic device 100 may include three cameras: one main camera, one wide-angle camera, and one long-focus camera.

Optionally, when the electronic device 100 includes a plurality of cameras, the plurality of cameras may all be disposed in the front, or may all be disposed in the rear, or some of the cameras may be disposed in the front, and others may be disposed in the rear. This is not limited in this embodiment of this application.

In addition, although not shown in the figure, the electronic device 100 may further include a flashlight module and the like.

In addition, although not shown in the figure, the electronic device 100 may further include a Bluetooth module and the like.

In addition, although not shown in the figure, the electronic device 100 may further include a neural-network (NN) processing unit (NPU). The NPU quickly processes input information by referring to a structure of a biological neural network, for example, by referring to a transfer mode between human brain neurons, and may further continuously perform self-learning. Applications such as intelligent cognition of the electronic device 100, for example, image recognition, facial recognition, speech recognition, and text understanding, may be implemented through the NPU.

Figure 3:
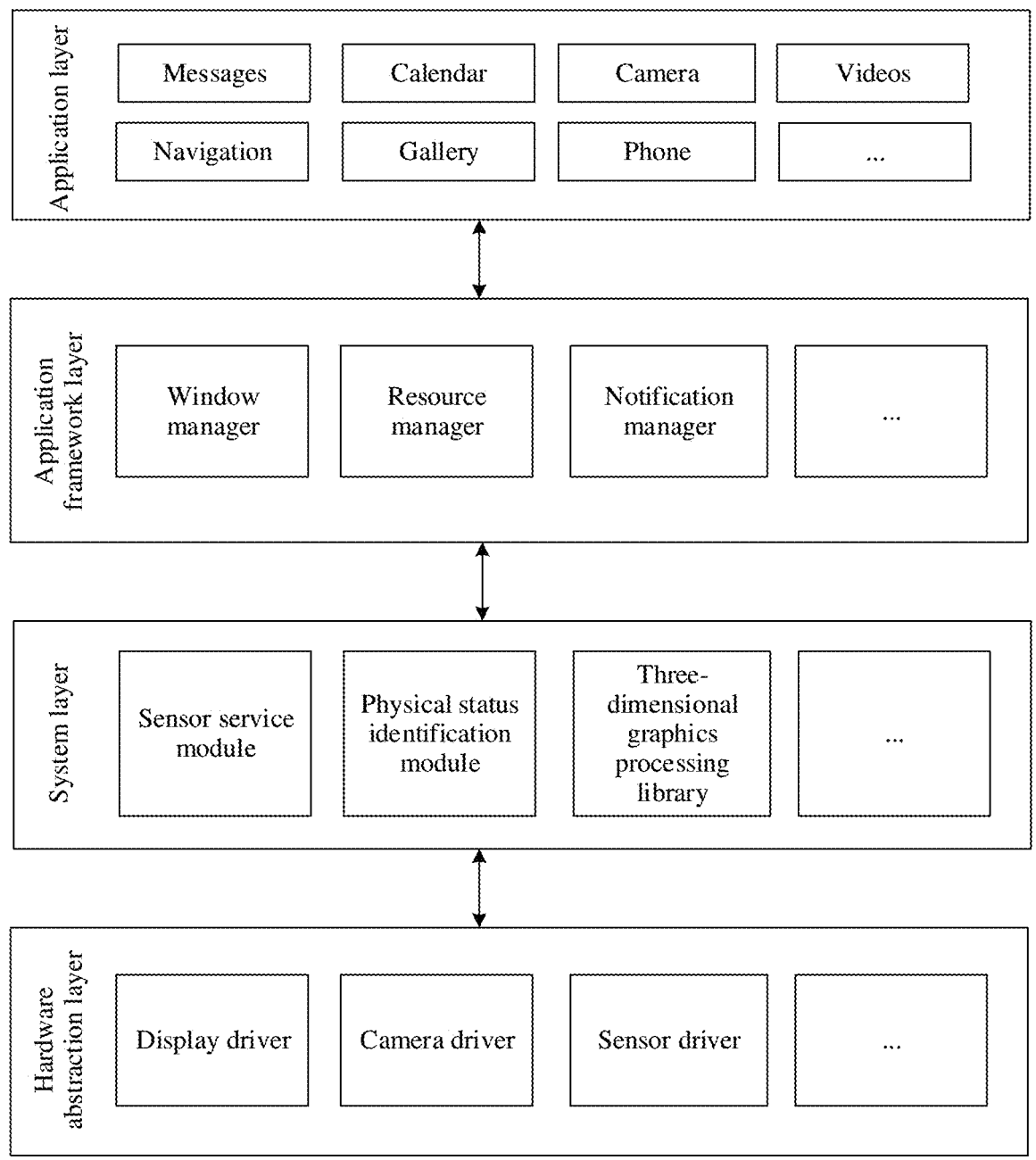
FIG. 3 is an example schematic diagram of a software architecture of an electronic device to which an image detection method is applicable according to an embodiment of this application.

A software system of the electronic device 100 may use a layered architecture, an event-driven architecture, a microkernel architecture, a micro service architecture, or a cloud architecture. FIG. 3 is a schematic diagram of a software structure of an electronic device 100 according to an embodiment of this application. For example, an operating system of the electronic device 100 is an Android system. In some embodiments, the Android system is divided into four layers: an application layer, an application framework (FWK) layer, a system layer, and a hardware abstraction layer. The layers communicate with each other through a software interface.

As shown in FIG. 3, the application layer may include a series of application packages, and the application packages may include applications such as Messages, Calendar, Camera, Videos, Navigation, Gallery, and Phone.

The application framework layer provides an application programming interface (API) and a programming framework for an application at the application layer. The application framework layer may include some predefined functions, such as a function for receiving an event sent by the application framework layer.

As shown in FIG. 3, the application framework layer may include a window manager, a resource manager, a notification manager, and the like.

The window manager is configured to manage a window program. The window manager may obtain a size of a display, determine whether there is a status bar, perform screen locking, take a screenshot, and the like. The content provider is configured to: store and obtain data, and enable the data to be accessed by an application. The data may include a video, an image, audio, calls that are made and received, a browsing history and a browsing bookmark, an address book, and the like.

The resource manager provides various resources for an application such as a localized character string, an icon, a picture, a layout file, and a video file.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application running on the background or a notification that appears on a screen in a form of a dialog window. For example, text information is displayed in the status bar, an announcement is produced, the electronic device vibrates, or an indicator light blinks.

The application framework layer may further include: a view system, where the view system includes visual controls such as a control for displaying a text and a control for displaying a picture. The view system may be configured to construct an application. A display interface may include one or more views. For example, a display interface including an SMS message notification icon may include a view for displaying a text and a view for displaying a picture.

The phone manager is configured to provide a communication function of the electronic device 100, for example, management of a call status (including answering, declining, or the like).

The system layer may include a plurality of functional modules, for example, a sensor service module, a physical status identification module, and a three-dimensional graphics processing library (for example, OpenGL ES).

The sensor service module is configured to monitor sensor data uploaded by various sensors at a hardware layer, to determine a physical status of the electronic device 100.

The physical status identification module is configured to: analyze and identify a user gesture, a face, and the like.

The three-dimensional graphics processing library is configured to implement three-dimensional graphics drawing, image rendering, composition, layer processing, and the like.

The system layer may further include: a surface manager, configured to manage a display subsystem and provide fusion of 2D and 3D layers for a plurality of applications.

A media library supports playback and recording in a plurality of commonly used audio and video formats, static image files, and the like. The media library may support a plurality of audio and video coding formats, for example, MPEG-4, H.264, MP3, AAC, AMR, JPG, and PNG.

The hardware abstraction layer is a layer between hardware and software. The hardware abstraction layer may include a display driver, a camera driver, a sensor driver, and the like, and is configured to drive related hardware, for example, a display, a camera, and a sensor, at the hardware layer.

The system layer may further include an image processing library. After a camera application is opened, the camera application may obtain a to-be-detected image collected by the camera of the electronic device, and determine impact of a light source on clarity of the to-be-detected image by performing light source region detection and foreground region detection on the to-be-detected image, to determine whether backlight blur exists in the to-be-detected image.

The following embodiments may be implemented in the electronic device 100 having the foregoing hardware structure/software structure. In the following embodiments, the electronic device 100 is used as an example to describe the image detection method provided in embodiments of this application.

Figure 4A:
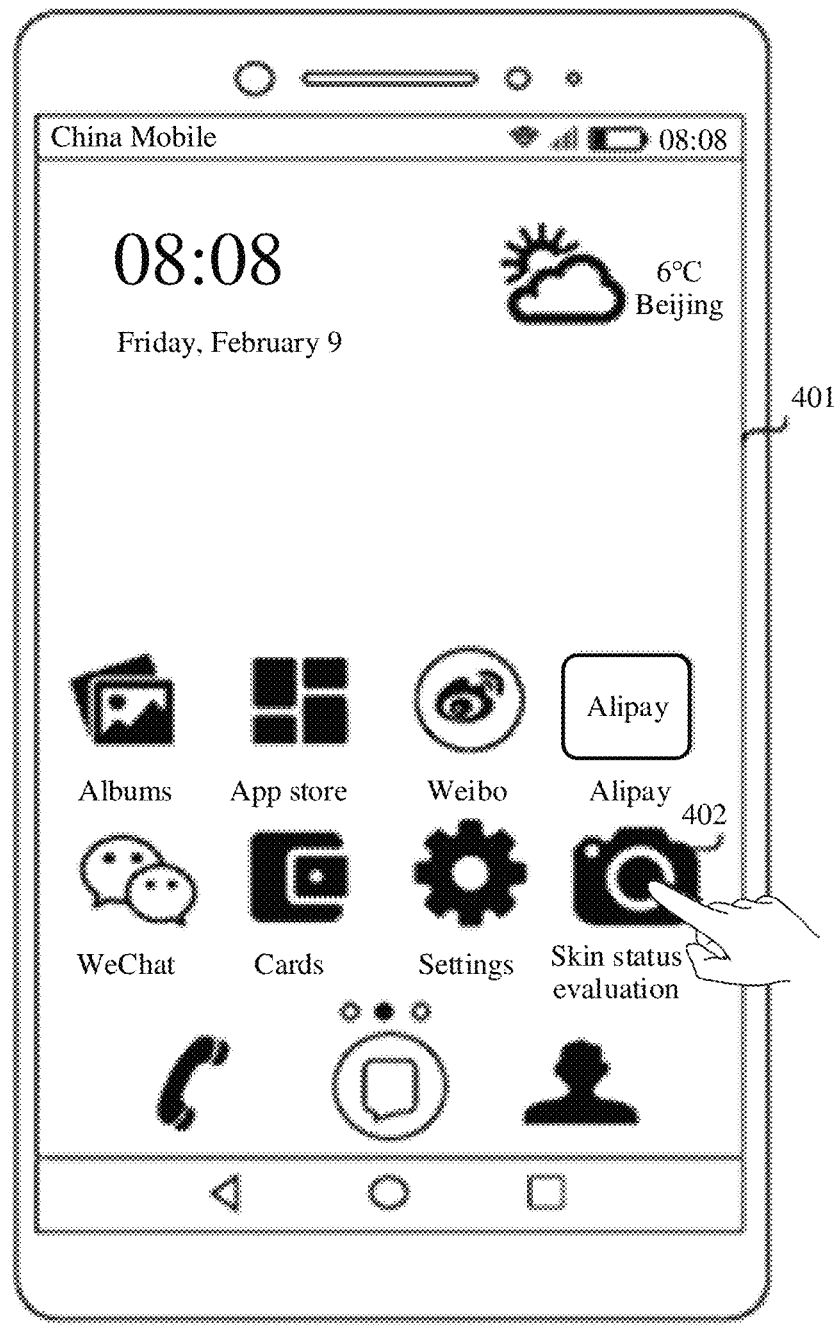
FIG. 4a is an example schematic diagram of a group of display interfaces according to an embodiment of this application.
Figure 4B:
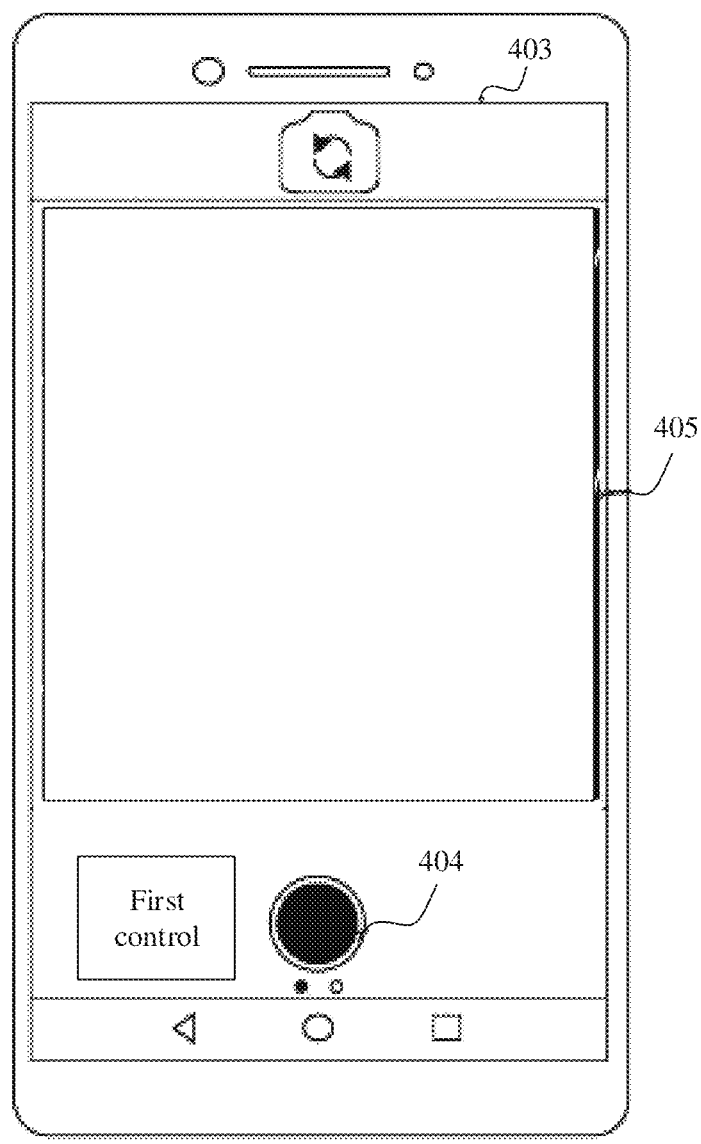
FIG. 4b is an example schematic diagram of another group of display interfaces according to an embodiment of this application.

FIG. 4a shows a graphical user interface (GUI) of the electronic device (for example, a mobile phone) shown in FIG. 2 and FIG. 3. The GUI may be a home screen 401 of the electronic device. After detecting an operation that a user taps an icon 402 of a facial skin status evaluation application (APP) on the home screen 401, the electronic device may open the facial skin status evaluation application. FIG. 4b shows another GUI. The GUI may be referred to as a processing interface 403 of a facial skin status evaluation app. After the electronic device detects that a user taps an icon 404 for obtaining a photo in the processing interface 403, the electronic device may open an album, and the user selects a picture from the album and loads the picture onto an image box 405. Alternatively, after tapping an icon 404, a user starts a camera and performs shooting by using the camera in a first shooting mode, and then loads a shot image onto an image box 405. A preview image that exists in the first shooting mode after the camera is started may be further displayed in the image box 405.

After a to-be-detected image is loaded onto the image box 405, the electronic device may automatically start to detect the to-be-detected image in the image box 405, to detect whether the to-be-detected image is blurred.

In a possible implementation, the processing interface 403 includes a first control that is used to indicate to perform blur detection. When the electronic device 100 detects that the user taps the first control, the electronic device detects the to-be-detected image in the image box 405, to detect whether the to-be-detected image is blurred. Specifically, a light source region of the to-be-detected image and a foreground region of the to-be-detected image may be determined, a blurring degree of the image is determined based on the light source region and the foreground region, and whether the image is blurred is determined based on the blurring degree of the image.

Specifically, during blur detection, the electronic device 100 performs color space conversion on the to-be-detected image to obtain a brightness value of each pixel of the image obtained through the color space conversion, and determines, by comparing the brightness value of each pixel with a preset brightness threshold, a quantity of pixels that exceeds the preset brightness threshold, to determine the light source region. Then, the electronic device determines a foreground target in the to-be-detected image by using a feature point detection method, and determines the foreground region by determining a location of the foreground target in the to-be-detected image. The electronic device calculates the blurring degree of the to-be-detected image based on a quantity of all pixels in the light source region and a quantity of all pixels in the foreground region, and compares the blurring degree of the to-be-detected image with a predetermined threshold. If the blurring degree of the image is greater than or equal to the predetermined threshold, the electronic device determines that backlight blur exists in the to-be-detected image. If the blurring degree of the image is less than the predetermined threshold, the electronic device determines that backlight blur does not exist in the to-be-detected image.

If the electronic device detects that an image shot in a backlight condition or a frame of image in a preview image in a backlight condition is blurred, the electronic device switches a current shooting mode from the first shooting mode to a second shooting mode, where the first shooting mode is different from the second shooting mode. Alternatively, if the electronic device detects that the to-be-detected image obtained from the album is blurred in a backlight condition, the electronic device prompts the user to select another image, or re-shoot an image.

Figure 5:
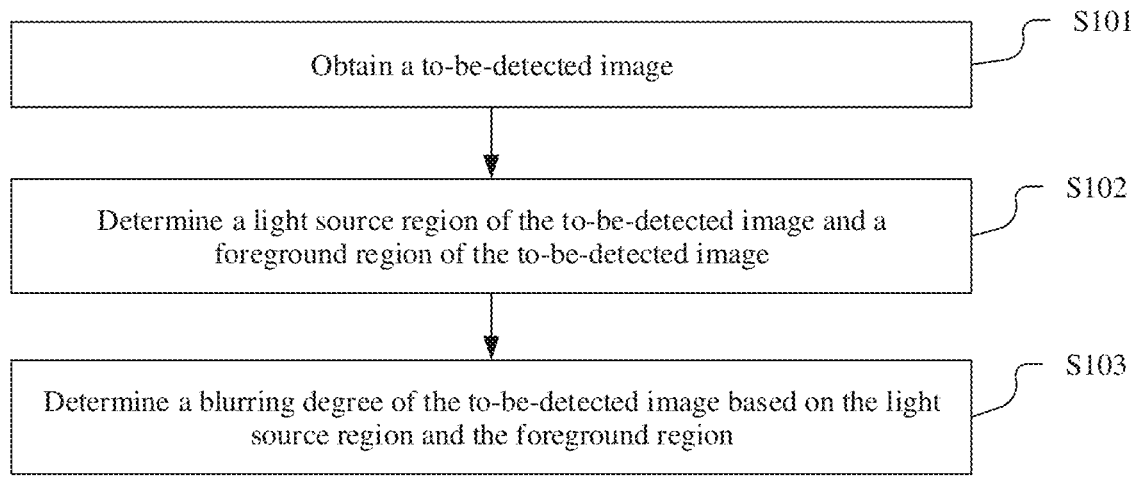
FIG. 5 is an example schematic flowchart of an image detection method according to an embodiment of this application.

FIG. 5 is a schematic flowchart of an implementation of an image detection method according to an embodiment of this application. The method may be implemented in the electronic device (for example, a mobile phone or a tablet computer) shown in FIG. 2 or FIG. 3. As shown in FIG. 5, the method may include the following steps.

S101: Obtain a to-be-detected image.

The to-be-detected image may be an image currently shot, or may be a frame of image that exists in a preview image after a camera is started, or may be an image in an album, or the like.

For example, after the user taps the icon 404 shown in FIG. 4b, the electronic device opens an album for the user to select a shot photo to obtain the to-be-detected image, and may load the obtained to-be-detected image onto the image box 405. Alternatively, after tapping the icon 404, the user starts the camera and shoots an image by using the camera in the first shooting mode to obtain the to-be-detected image, and then loads the shot to-be-detected image onto the image box 405. A preview image that exists in the first shooting mode after the camera is started may be further displayed in the image box 405, and a frame of image in the preview image is used as the to-be-detected image.

Specifically, to evaluate a facial skin status, the obtained image needs to include a face image. After the image including the face image is obtained, a part of the image including only the face image may be captured as the to-be-detected image, that is, the to-be-detected image obtained in this embodiment may be a to-be-detected image including the face image.

S102: Determine a light source region of the to-be-detected image and a foreground region of the to-be-detected image.

Specifically, light source region detection is performed on the to-be-detected image to determine the light source region of the to-be-detected image. Color space conversion is performed on the to-be-detected image to determine brightness of all pixels of the image obtained through the color space conversion, and the light source region is determined based on the brightness of all the pixels. Then, the image obtained through the color space conversion is re-converted to an original color space, a foreground target of the to-be-detected image is detected based on a feature point detection mode, and a location of the foreground target in the to-be-detected image is determined, to determine the foreground region.

For example, after detecting that the to-be-detected image is loaded onto the image box 405, the electronic device 100 automatically performs blur detection on the to-be-detected image loaded onto the image box 405.

For example, when the user taps a first control, blur detection on the to-be-detected image loaded onto the image box 405 may be triggered. In this case, the electronic device 100 performs light source region detection on the to-be-detected image to determine the light source region. The light source region detection may be: performing color space conversion on the image to obtain a brightness value of each pixel, and determining the light source region according to a threshold segmentation method; and then re-converting the image obtained through the color space conversion to an original color space, detecting a foreground target in the to-be-detected image based on a feature point detection mode, and determining a location of the foreground target in the to-be-detected image, to determine the foreground region.

In an embodiment, the determining a light source region of the to-be-detected image includes: performing color space conversion on the to-be-detected image, and obtaining a brightness value of each pixel of the image obtained through the color space conversion; and determining a region of a pixel whose brightness value is greater than a preset brightness threshold as the light source region of the to-be-detected image.

Specifically, the light source region can be determined based on the brightness value of each pixel of the to-be-detected image by using a threshold segmentation method. The image is first converted to an HSV (Hue, Saturation, Value) color space or an LAB (CIELAB color model) color space through color space conversion, so that the brightness value of each pixel of the image can be obtained. It may be understood that the image may also be converted to another color space to determine the brightness value of each pixel of the image. This is not limited herein.

Specifically, if the image is converted to the HSV color space, a V value (Value) of each pixel is the brightness value of the pixel. If the image is converted to the LAB color space, an L value of each pixel is the brightness value of the pixel. It should be noted that the brightness value may also be obtained by performing mathematical transformation on an original brightness value in a monotonically increasing/decreasing manner, for example, $L'=2L$.

Figure 6A:
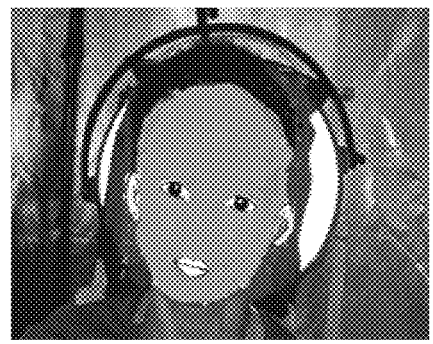
FIG. 6a is an example schematic diagram of an image of a to-be-detected image in a current color space.
Figure 6B:
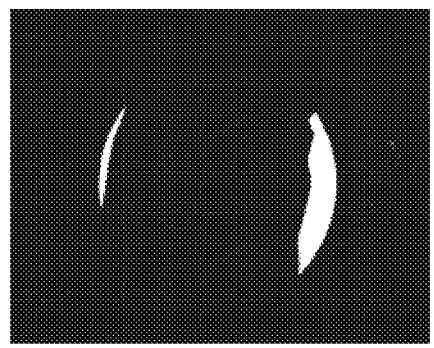
FIG. 6b is an example schematic diagram of an image obtained by performing light source segmentation on a to-be-detected image.

Specifically, the preset brightness threshold may be determined by viewing, by using a mask generation method, a light source image obtained through segmentation. FIG. 6a shows an image in a current color space. FIG. 6b shows an image obtained through light source segmentation. A brightness value of each pixel of the image obtained through the light source segmentation is compared with the preset brightness threshold. If the brightness value of the pixel is greater than the preset brightness threshold, it is determined that the pixel is a pixel in the light source region. Therefore, only a region of a pixel whose brightness value is greater than the preset brightness threshold needs to be determined as the light source region of the to-be-detected image.

In an embodiment, the determining a foreground region of the to-be-detected image includes: detecting a foreground target of the to-be-detected image; and determining a location of the foreground target in the to-be-detected image, and determining the location of the foreground target in the to-be-detected image as the foreground region of the to-be-detected image.

It should be noted that the foreground target may be a target having a dynamic feature in the to-be-detected image, for example, a person or an animal, or the foreground target may be a scene that is close to a viewer and that has a static feature, for example, a flower or food.

In this embodiment, a trained foreground detection model may be used to detect the foreground target in the to-be-detected image. For example, the foreground detection model may be a model having a foreground target detection function, such as a single shot multibox detector (SSD). Certainly, another foreground detection manner may also be used. For example, whether a foreground target (for example, a face) exists in the to-be-detected image is detected by using a mode recognition algorithm, and after it is detected that the foreground target exists, a location of the foreground target in the to-be-detected image is determined by using a target positioning algorithm or a target tracking algorithm.

It should be noted that other foreground target detection solutions that can be easily figured out by persons skilled in the art within the technical scope disclosed in the present technology shall also fall within the protection scope of the present technology.

An example in which the trained foreground detection model is used to detect the foreground target in the to-be-detected image is used to describe a specific training process of the foreground detection model: pre-obtaining a sample picture and a detection result corresponding to the sample picture, where the detection result corresponding to the sample picture includes a category and a location of each foreground target in the sample picture; detecting the foreground target in the sample picture by using an initial foreground detection model, and calculating detection accuracy of the initial foreground detection model based on the pre-obtained detection result corresponding to the sample picture; and if the detection accuracy is less than a preset first detection threshold, adjusting a parameter of the initial foreground detection model, detecting the sample picture by using a foreground detection model whose parameter is adjusted until detection accuracy of the adjusted foreground detection model is greater than or equal to the first detection threshold, and using the foreground detection model as the trained foreground detection model, where a parameter adjustment method includes but is not limited to a stochastic gradient descent algorithm, a dynamic update algorithm, and the like.

The foreground target is determined by performing, based on the foreground detection model, foreground target detection on the to-be-detected image that is converted to the original color space, and then the foreground region is determined based on the location of the foreground target in the to-be-detected image.

For example, the foreground target is a face image region. The foreground detection model may be used to perform face feature detection according to the HIA276 feature point detection method, and then select a foreground region including a face. In this embodiment, the foreground region detection may be implemented by the neural-network (NN) processing unit (NPU) of the electronic device 100. The NPU performs facial recognition on the to-be-detected image, selects, by using a rectangle, the foreground region including the face (the foreground target), and automatically outputs an area of the target rectangular region.

Figure 7:
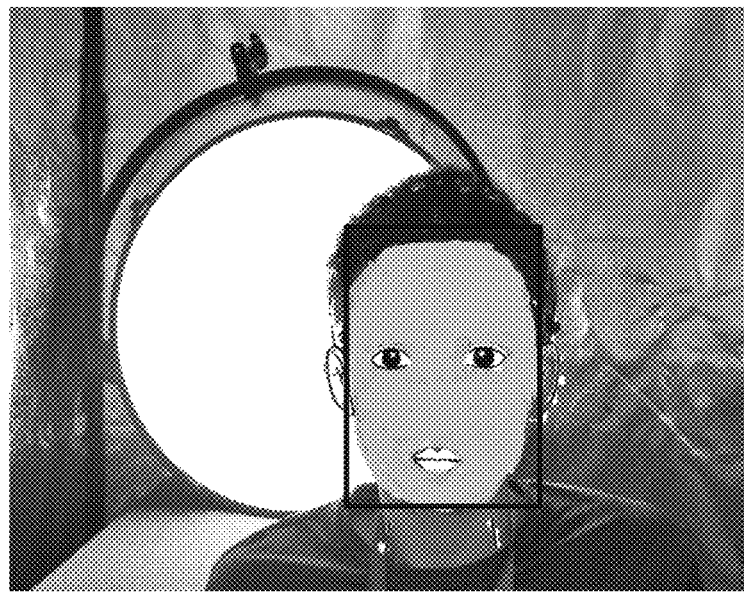
FIG. 7 is an example schematic diagram of a foreground target according to an embodiment of this application.

For example, a rectangular region shown in FIG. 7 is a foreground region, and a specific location of the foreground region can be determined by determining location coordinates of pixels of four vertices of the rectangle in the to-be-detected image. It should be understood that the foreground region including the face (the foreground target) may alternatively be selected by using a circle, may be selected by using a triangle, or may be selected by using a plurality of shapes such as a pentagon.

An area of the foreground region can be determined by calculating the area of the rectangular region. The location coordinates of the four vertices of the rectangular region are determined, so that a length and a width of the rectangular region are determined, and the area of the rectangular region is determined, that is, the area of the foreground region is obtained.

Figure 8A:
FIG. 8a is an example schematic diagram of an image in which a foreground target is a foam box according to this application.
Figure 8B:
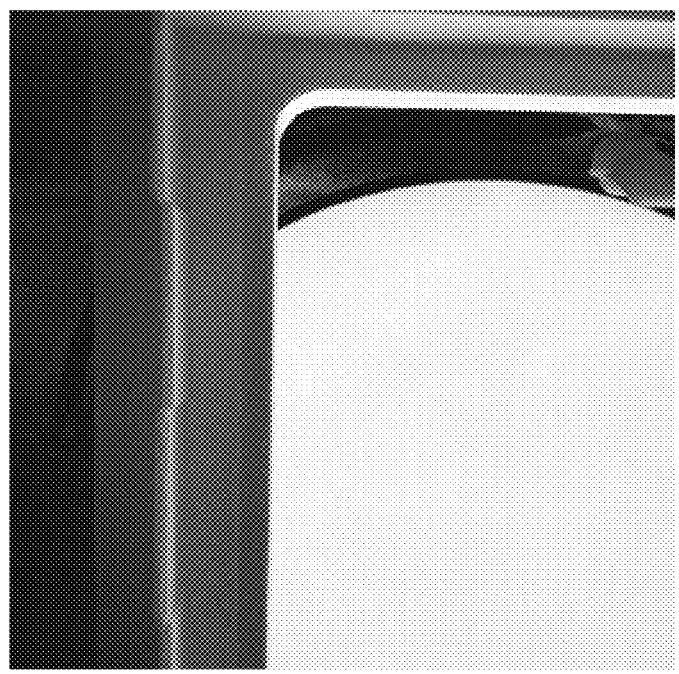
FIG. 8b is another example schematic diagram of an image in which a foreground target is a foam box according to this application.

It should be noted that the foreground target may alternatively be another object. For example, as shown in FIG. 8a and FIG. 8b, the foreground target is a foam box.

S103: Determine a blurring degree of the to-be-detected image based on the light source region and the foreground region.

Specifically, the blurring degree of the to-be-detected image is determined based on a quantity of all pixels in the light source region and a quantity of all pixels in the foreground region.

Specifically, a size of the light source region is a most important factor that affects whether the to-be-detected image is blurred, and a size of the foreground region is also an important factor that affects whether the to-be-detected image is blurred. Therefore, to determine the blurring degree of the to-be-detected image, a function value of a strict increasing function of a ratio of a quantity of all pixels in the light source region to a quantity of all pixels in the foreground region may be used as an impact degree of whether a backlight source causes blurring of the to-be-detected image, that is, a function value of a strict increasing function of a ratio of a quantity of pixels whose brightness values are greater than a preset brightness threshold to the quantity of all pixels in the foreground region is used as the blurring degree S of the to-be-detected image.

In an embodiment, a calculation formula of the blurring degree S is as follows: S=f(a, b)=a/b, where a is the quantity of all pixels in the light source region, b is the quantity of all pixels in the foreground region, and S is the blurring degree.

In another embodiment, a calculation formula of the blurring degree S is as follows: S=f(a, b)=log(a/b), where a is the quantity of all pixels in the light source region, b is the quantity of all pixels in the foreground region, and S is the blurring degree.

It should be noted that impact of the area of the light source region and the area of the foreground region on the blurring degree can be reflected provided that the blurring degree is a strict increasing function of a/b. Therefore, f(a, b) has infinite variations, for example, f(a, b)=log 2(a−b).

In another embodiment, the blurring degree of the to-be-detected image is determined based on a quantity of all pixels in the light source region and an area of the foreground region. A function value of a strict increasing function of a ratio of the quantity of all pixels in the light source region to the area of the foreground region is used as an impact degree of whether a backlight source causes blurring of the to-be-detected image, that is, a function value of a strict increasing function of a ratio of a quantity of pixels whose brightness values are greater than a preset brightness threshold to the area of the foreground region is used as the blurring degree S of the to-be-detected image.

A calculation formula of the blurring degree S is as follows: S=f(a, b)=a/b, where a is the quantity of all pixels in the light source region, b is the area of the foreground region, and S is the blurring degree.

In another embodiment, a calculation formula of the blurring degree S is as follows: S=f(a, b)=log(a/b), where a is the quantity of all pixels in the light source region, b is the area of the foreground region, and S is the blurring degree.

In an embodiment, S103 includes: determining whether a function value of an increasing function of a ratio of the quantity of all pixels in the light source region to the quantity of all pixels in the foreground region is greater than a predetermined threshold; and if the function value of the increasing function of the ratio of the quantity of all pixels in the light source region to the quantity of all pixels in the foreground region is greater than the predetermined threshold, determining that the to-be-detected image is a blurred image.

Specifically, the blurring degree of the to-be-detected image (that is, the function value of the increasing function of the ratio of the quantity of all pixels in the light source region to the quantity of all pixels in the foreground region) is compared with the predetermined threshold. If the blurring degree of the image is greater than or equal to the predetermined threshold, it is determined that a detection result is that the to-be-detected image is the blurred image. If the blurring degree of the image is less than the predetermined threshold, it is determined that a detection result is that the to-be-detected image is a clear image.

It should be noted that, the predetermined threshold may be a predetermined threshold obtained by performing parameter adjustment after training and testing are performed on a large quantity of sample images, that is, if the blurring degree of the to-be-detected image is greater than or equal to the predetermined threshold, it may be determined that the to-be-detected image is the blurred image.

Specifically, an image classifier may be constructed based on a KNN (K-Nearest Neighbor) classifier. A principle of the KNN classifier is to compare an image in a test set with each image in a training set, and assign a label value of a most similar image in the training set to the image. For example, in CIFAR-10, 32×32×3 pixel blocks are compared. A simplest method is to compare pixels one by one, finally add all difference values to obtain a value of a difference between two images, and determine an image category according to a classification decision principle (for example, majority voting). When the image classifier is constructed, an initial model parameter and an initial predetermined threshold are pre-assigned to the image classifier. Training and testing the image classifier is a process of performing parameter adjustment on the initial model parameter and the predetermined threshold, so that an image classifier that meets a classification accuracy requirement can be obtained.

Specifically, traversal optimization may be further performed based on sample images in a training set to search for a trainer or a combination of trainers with a best classification effect, and the trainer or the combination of trainers is used as the image classifier in this embodiment.

Specifically, the image classifier is trained and tested based on the sample images to determine the predetermined threshold.

Specifically, the sample images include sample images in a training set and sample images in a test set, the sample images in the training set include a sample image in a first training set and a sample image in a second training set, and the sample images in the test set include a sample image in a first test set and a sample image in a second test set. The sample image in the first training set is a sample image that is in the training set and that is labeled "clear", the sample image in the second training set is a sample image that is in the training set and that is labeled "blurred", the sample image in the first test set is a sample image that is in the test set and that is labeled "clear", and the sample image in the second test set is a sample image that is in the test set and that is labeled "blurred". For example, 100 sample images are grouped into two groups, a first group includes 50 sample images labeled "blurred", and a second group includes 50 sample images labeled "clear". Then, 30 sample images in the 50 sample images labeled "blurred" are used as sample images in the first training set, and 20 sample images in the 50 sample images labeled "blurred" are used as sample images in the first test set; and 30 sample images in the 50 sample images labeled "clear" are used as sample images in the second training set, and 20 sample images in the 50 sample images labeled "clear" are used as sample images in the second test set.

There are many methods for training the image classifier, for example, an AadaBboost method based on a Hhaar feature and an SVM (support vector machine) method. Specifically, sample images in a training set and sample images in a test set are first constructed. Then, traversal optimization is performed based on the sample images in the training set to search for a trainer or a combination of trainers with a best classification effect, and the trainer or the combination of trainers is used as the image classifier in this embodiment. Finally, classification accuracy of the found image classifier is verified based on the sample images in the test set, and the image classifier can be used after an accuracy requirement (for example, accuracy of 70%) is met. If the requirement is not met, the initial model parameter and the predetermined threshold are adjusted, and the entire process is continuously repeated cyclically until the accuracy requirement is finally met, so that the classifier can determine the predetermined threshold.

In this embodiment, after the foregoing parameter adjustment process, when the blurring degree S is equal to a/b, it is determined that the predetermined threshold may be 0.12; or when the blurring degree S is equal to log(a/b), it is determined that the preset blurring threshold is −0.3269.

It should be noted that the image detection method provided in this embodiment can be used not only for backlight blur detection of a face, but also for backlight blur detection of another object.

For example, as shown in FIG. 8a and FIG. 8b, after images in FIG. 8a and FIG. 8b are respectively loaded onto the image box 405, the first control is tapped to trigger a detection operation on the images. In this case, a detection result corresponding to FIG. 8a is that the image is clear (backlight blur does not exist in the image); and a detection result corresponding to FIG. 8b is that the image is blurred (backlight blur exists in the image).

In this embodiment, after obtaining the to-be-detected image, the electronic device can automatically perform backlight blur detection on the obtained to-be-detected image, or may perform backlight blur detection after the user taps the first control, to output a corresponding detection result. If it is detected that backlight blur exists in the image, the user is prompted to re-obtain an image, for example, select another image or switch to a Flash mode for photographing again to obtain an image, so as to improve accuracy of facial skin evaluation.

Figure 9:
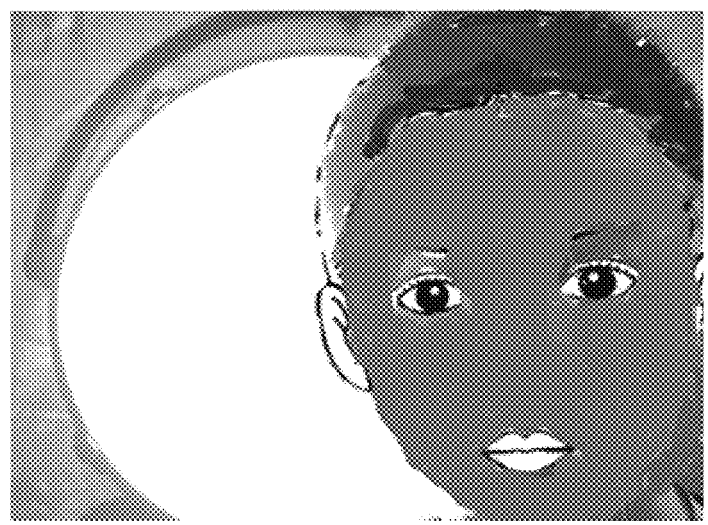
FIG. 9 is an example schematic diagram of a to-be-detected image in an image detection method according to an embodiment of this application.

For example, as shown in FIG. 9, after a to-be-detected image in FIG. 9 is loaded onto the image box 405, the first control is tapped to trigger a detection operation on the to-be-detected image. In this case, a detection result corresponding to FIG. 9 is that the image is blurred (backlight blur exists in the image).

In an embodiment, the obtaining a to-be-detected image includes: obtaining a preview frame image in a first shooting mode; and correspondingly, the determining a blurring degree of the to-be-detected image based on the light source region and the foreground region includes: if it is determined, based on the light source region and the foreground region, that the preview frame image is a blurred image, switching a current shooting mode from the first shooting mode to a second shooting mode, where the first shooting mode is different from the second shooting mode.

In this embodiment, the obtained to-be-detected image is the preview frame image in the first shooting mode. Because the preview frame image in the first shooting mode is the blurred image, if the image shot in the first shooting mode is definitely blurred, the current shooting mode needs to be switched from the first shooting mode to the second shooting mode.

For example, the first shooting mode is a Torch mode, and the second shooting mode is a Flash mode. The switching a current shooting mode from the first shooting mode to a second shooting mode is specifically: An electronic device 100 sends a control instruction to a flashlight module of the electronic device, to switch a flashlight from a steady-on mode to a mode in which the flashlight flashes once during photographing.

According to the image detection method provided in this embodiment of this application, an artificial intelligence terminal can effectively detect whether an image shot in a backlight condition is blurred, and determine impact of a light source on clarity of the image by performing light source region detection and foreground region detection on the image, to effectively detect whether the image shot in the backlight condition is blurred.

It should be understood that sequence numbers of the steps do not mean an execution sequence in the foregoing embodiments. The execution sequence of the processes should be determined based on functions and internal logic of the processes, and should not constitute any limitation on the implementation processes of the embodiments of this application.

Figure 10:
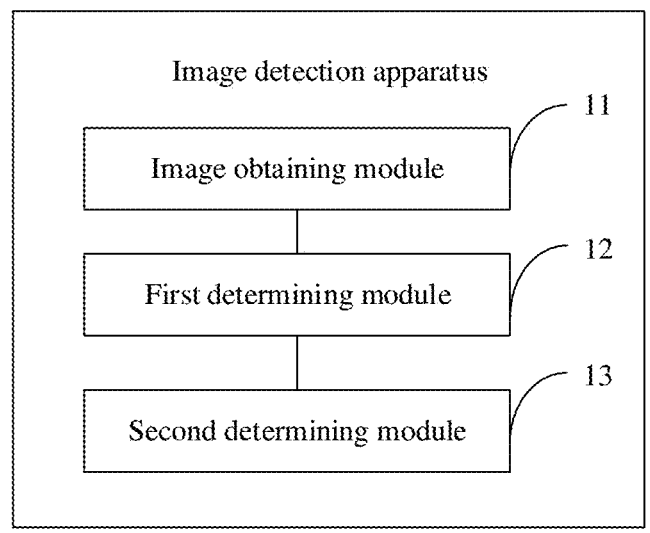
FIG. 10 is an example schematic diagram of a structure of an image detection apparatus according to an embodiment of this application.

Corresponding to the image detection method in the foregoing embodiment, FIG. 10 is a block diagram of a structure of an image detection apparatus according to an embodiment of this application. For ease of description, only a part related to embodiments of this application are shown.

Refer to FIG. 10. The image detection apparatus includes: an image obtaining module 11, configured to obtain a to-be-detected image; a first determining module 12, configured to determine a light source region of the to-be-detected image and a foreground region of the to-be-detected image; and a second determining module 13, configured to determine a blurring degree of the image based on the light source region and the foreground region.

Optionally, the first determining module 12 includes: a conversion unit, configured to: perform color space conversion on the to-be-detected image, and obtain a brightness value of each pixel of the image obtained through the color space conversion; and a first determining unit, configured to determine a region of a pixel whose brightness value is greater than a preset brightness threshold as the light source region of the to-be-detected image.

Optionally, the first determining module 12 includes: a detection unit, configured to detect a foreground target in the to-be-detected image; and a second determining unit, configured to: determine a location of the foreground target in the to-be-detected image, and determine the location of the foreground target in the to-be-detected image as the foreground region of the to-be-detected image.

Optionally, the second determining module 13 includes: a third determining unit, configured to determine a blurring degree of the to-be-detected image based on a quantity of all pixels in the light source region and a quantity of all pixels in the foreground region.

Optionally, the third determining unit includes: a determining unit, configured to determine whether a function value of an increasing function of a ratio of the quantity of all pixels in the light source region to the quantity of all pixels in the foreground region is greater than a predetermined threshold; and a fourth determining unit, configured to: if the function value of the increasing function of the ratio of the quantity of all pixels in the light source region to the quantity of all pixels in the foreground region is greater than the predetermined threshold, determine that the to-be-detected image is a blurred image.

Optionally, the third determining unit is further configured to determine the blurring degree of the to-be-detected image based on the quantity of all pixels in the light source region and an area of the foreground region.

Optionally, the image obtaining module 11 includes: a first image obtaining unit, configured to obtain a preview frame image in a first shooting mode.

Correspondingly, the second determining module 13 is further configured to: if it is determined, based on the light source region and the foreground region, that the preview frame image is a blurred image, switch a current shooting mode from the first shooting mode to a second shooting mode, where the first shooting mode is different from the second shooting mode.

It should be noted that content such as information exchange and an execution process between the foregoing modules/units is based on a same concept as that in the method embodiments of this application. For details about specific functions and technical effects of the content, refer to the method embodiments.

It may be clearly understood by persons skilled in the art that, for convenient and brief description, division into the foregoing functional units and modules is merely used as an example for illustration. In actual application, the foregoing functions can be allocated to different functional units and modules for implementation based on a requirement, that is, an inner structure of the apparatus is divided into different functional units or modules to implement all or some of the functions described above. Functional units and modules in the embodiments may be integrated into one processing unit, or each of the units may exist alone physically, or two or more units may be integrated into one unit. The integrated unit may be implemented in a form of hardware, or may be implemented in a form of a software functional unit. In addition, specific names of the functional units or modules are merely provided for distinguishing between the units or modules, but are not intended to limit the protection scope of this application. For a specific working process of the units or modules in the foregoing system, refer to a corresponding process in the foregoing method embodiments.

Therefore, the image detection apparatus provided in this embodiment can also determine impact of a light source on clarity of the image by performing light source region detection and foreground region detection on the image, to determine whether backlight blur exists in the image, so as to improve accuracy of an evaluation result of a facial skin status.

Figure 11:
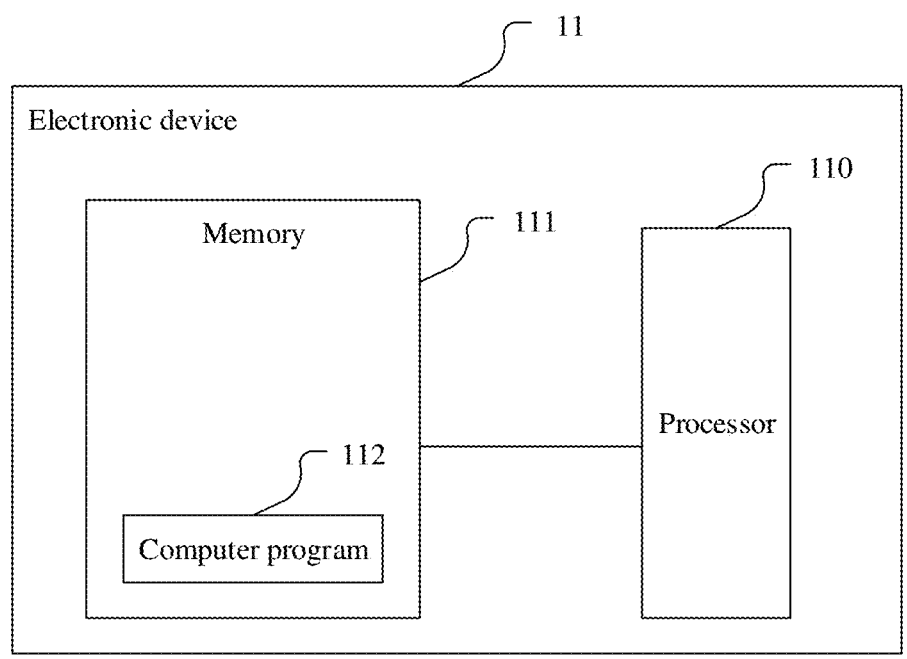
FIG. 11 is an example schematic diagram of a structure of an electronic device according to an embodiment of this application.

FIG. 11 is a schematic diagram of a structure of an electronic device according to an embodiment of this application. As shown in FIG. 11, the electronic device 11 in this embodiment includes at least one processor 110 (only one processor is shown in FIG. 11), a memory 111, and a computer program 112 that is stored in the memory 111 and that can be run on the at least one processor 110. When executing the computer program 112, the processor 110 implements steps in any one of the foregoing embodiments of the image detection method.

The electronic device 11 may be a computing device such as a desktop computer, a notebook computer, a palmtop computer, or a cloud server. The electronic device may include but is not limited to the processor 110 and the memory 111. Persons skilled in the art may understand that FIG. 11 is merely an example of the electronic device 11, and does not constitute a limitation on the electronic device 11. The electronic device may include more or fewer components than those shown in the figure, or may combine some components, or may have different components. For example, the electronic device may further include an input/output device, a network access device, or the like.

The processor 110 may be a central processing unit (CPU). The processor 110 may alternatively be another general-purpose processor, a digital signal processor (DSP), an application-specific integrated circuit (ASIC), a field-programmable gate array (FPGA) or another programmable logic device, a discrete gate or a transistor logic device, or a discrete hardware component. The general-purpose processor may be a microprocessor, or the processor may be any conventional processor or the like.

In some embodiments, the memory 111 may be an internal storage unit of the electronic device 11, for example, a hard disk or memory of the electronic device 11. In some other embodiments, the memory 111 may alternatively be an external storage device of the electronic device 11, for example, a plug-connected hard disk, a smart media card (SMC), a secure digital (SD) card, or a flash card that is disposed on the electronic device 11. Further, the memory 111 may alternatively include both an internal storage unit and an external storage device of the electronic device 11. The memory 111 is configured to store an operating system, an application, a boot loader, data, another program, and the like, for example, program code of the computer program. The memory 111 may be further configured to temporarily store data that has been output or is to be output.

An embodiment of this application further provides a network device. The network device includes at least one processor, a memory, and a computer program that is stored in the memory and that can run on the at least one processor. When executing the computer program, the processor implements steps in any one of the foregoing method embodiments.

An embodiment of this application further provides a computer-readable storage medium. The computer-readable storage medium stores a computer program. When the computer program is executed by a processor, steps in the foregoing method embodiments can be implemented.

An embodiment of this application provides a computer program product. When the computer program product runs on a mobile terminal, the mobile terminal is enabled to implement the steps in the foregoing method embodiments when executing the computer program product.

When the integrated unit is implemented in a form of a software functional unit and sold or used as an independent product, the integrated unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code, and the computer program code may be in a source code form, an object code form, an executable file form, some intermediate forms, or the like. The computer-readable medium may include at least any entity or apparatus that can carry computer program code to a photographing apparatus/terminal device, a recording medium, a computer memory, a read-only memory (ROM), a random access memory (RAM), an electrical carrier signal, a telecommunications signal, and a software distribution medium, for example, a USB flash drive, a removable hard disk, a magnetic disk, or an optical disk.

In the foregoing embodiments, descriptions of all embodiments have respective focuses. For a part that is not described in detail or recorded in an embodiment, refer to related descriptions in other embodiments.

Persons of ordinary skill in the art may be aware that, units and algorithm steps in the examples described with reference to embodiments disclosed in this specification can be implemented by electronic hardware or a combination of computer software and electronic hardware. Whether these functions are performed by hardware or software depends on particular applications and design constraints of the technical solutions. Persons skilled in the art may use different methods to implement the described functions for each particular application, but it should not be considered that the implementation goes beyond the scope of this application.

In embodiments provided in this application, it should be understood that the disclosed apparatus/network device and method may be implemented in other manners. For example, the described apparatus/network device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. Some or all of the units may be selected based on an actual requirement to achieve the objectives of the solutions of embodiments.

The foregoing embodiments are merely intended to describe the technical solutions of this application, but are not to limit this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:

1. An image detection method implemented via an electronic device, the image detection method comprising:
   obtaining a to-be-detected image;
   determining a light source region of the to-be-detected image;
   determining a foreground region of the to-be-detected image; and
   determining a blurring degree of the to-be-detected image by determining whether a function value of an increasing function of a ratio of a quantity of all pixels in the light source region, to a quantity of all pixels in the foreground region, is greater than a threshold.

2. The image detection method according to claim 1, wherein determining the light source region of the to-be-detected image comprises:
   performing color space conversion on the to-be-detected image, and obtaining a brightness value of each pixel of an image obtained through the color space conversion; and
   determining a region of a pixel whose brightness value is greater than a specified brightness threshold as the light source region of the to-be-detected image.

3. The image detection method according to claim 1, wherein determining the foreground region of the to-be-detected image comprises:
   detecting a foreground target of the to-be-detected image;
   determining a location of the foreground target in the to-be-detected image; and
   determining the location of the foreground target as the foreground region of the to-be-detected image.

4. The image detection method according to claim 1, further comprising:
   determining the to-be-detected image is a blurred image in association with the function value of the increasing function of the ratio of the quantity of all pixels in the light source region, to the quantity of all pixels in the foreground region, being greater than the threshold.

5. The image detection method according to claim 1, wherein the obtaining the to-be-detected image comprises:
   obtaining a preview frame image in a first shooting mode; and
   in association with, based on the light source region and the foreground region, the preview frame image being a blurred image, switching a current shooting mode from the first shooting mode to a second shooting mode, wherein the first shooting mode is different from the second shooting mode.

6. An electronic device, comprising:
   a processor; and
   a memory configured to store computer readable instructions that, when executed by the processor, cause the electronic device to:
   obtain a to-be-detected image;
   determine a light source region of the to-be-detected image;
   determine a foreground region of the to-be-detected image; and
   determine a blurring degree of the to-be-detected image by determining whether a function value of an increasing function of a ratio of a quantity of all pixels in the light source region, to a quantity of all pixels in the foreground region, is greater than a threshold.

7. The electronic device according to claim 6, wherein the electronic device is further caused to:
   perform color space conversion on the to-be-detected image, and obtaining a brightness value of each pixel of an image obtained through the color space conversion; and
   determine a region of a pixel whose brightness value is greater than a specified brightness threshold as the light source region of the to-be-detected image.

8. The electronic device according to claim 6, wherein the electronic device is further caused to:
   detect a foreground target of the to-be-detected image;
   determine a location of the foreground target in the to-be-detected image; and
   determine the location of the foreground target as the foreground region of the to-be-detected image.

9. The electronic device according to claim 6, wherein the electronic device is further caused to:

determine the to-be-detected image is a blurred image in association with the function value of the increasing function of the ratio of the quantity of all pixels in the light source region, to the quantity of all pixels in the foreground region, being greater than the threshold.

10. The electronic device according to claim 6, wherein the electronic device is further caused to:
obtain a preview frame image in a first shooting mode; and
in association with, based on the light source region and the foreground region, the preview frame image being a blurred image, switching a current shooting mode from the first shooting mode to a second shooting mode, wherein the first shooting mode is different from the second shooting mode.

11. A non-transitory computer-readable storage medium configured to store computer readable instructions that, when executed by a processor, cause the processor to provide execution comprising:
obtaining a to-be-detected image;
determining a light source region of the to-be-detected image;
determining a foreground region of the to-be-detected image; and
determining a blurring degree of the to-be-detected image by determining whether a function value of an increasing function of a ratio of a quantity of all pixels in the light source region, to a quantity of all pixels in the foreground region, is greater than a threshold.

12. The non-transitory computer-readable storage medium according to claim 11, wherein determining the light source region of the to-be-detected image comprises:
performing color space conversion on the to-be-detected image, and obtaining a brightness value of each pixel of an image obtained through the color space conversion; and
determining a region of a pixel whose brightness value is greater than a specified brightness threshold as the light source region of the to-be-detected image.

13. The non-transitory computer-readable storage medium according to claim 11, wherein determining the foreground region of the to-be-detected image comprises:
detecting a foreground target of the to-be-detected image;
determining a location of the foreground target in the to-be-detected image; and
determining the location of the foreground target as the foreground region of the to-be-detected image.

14. The non-transitory computer-readable storage medium according to claim 11, wherein the processor is further caused to provide execution comprising:
determining the to-be-detected image is a blurred image in association with the function value of the increasing function of the ratio of the quantity of all pixels in the light source region, to the quantity of all pixels in the foreground region, being greater than the threshold.

15. The non-transitory computer-readable storage medium according to claim 11, wherein the obtaining the to-be-detected image comprises:
obtaining a preview frame image in a first shooting mode; and
in association with, based on the light source region and the foreground region, the preview frame image being a blurred image, switching a current shooting mode from the first shooting mode to a second shooting mode, wherein the first shooting mode is different from the second shooting mode.

* * * * *